(12) United States Patent
Wolf et al.

(10) Patent No.: US 11,454,304 B2
(45) Date of Patent: Sep. 27, 2022

(54) ACTUATOR COMPRISING ANTI-BACKBEND CHAIN

(71) Applicant: IWIS Antriebssysteme GmbH & Co. KG, Munich (DE)

(72) Inventors: Thomas Wolf, Munich (DE); Florian Madlener, Fürstenfeldbruck (DE); Joel Tchaweu Tchatchoua, Puchheim (DE)

(73) Assignee: IWIS ANTRIEBSSYSTEME GMBH & CO. KG, Munich (DE)

( * ) Notice: Subject to any disclaimer, the term of this patent is extended or adjusted under 35 U.S.C. 154(b) by 119 days.

(21) Appl. No.: 16/980,766

(22) PCT Filed: Feb. 22, 2019

(86) PCT No.: PCT/EP2019/054427
§ 371 (c)(1),
(2) Date: Sep. 14, 2020

(87) PCT Pub. No.: WO2019/166340
PCT Pub. Date: Sep. 6, 2019

(65) Prior Publication Data
US 2021/0364068 A1 Nov. 25, 2021

(30) Foreign Application Priority Data
Mar. 2, 2018 (DE) .................. 10 2018 104 768.1

(51) Int. Cl.
*F16H 19/06* (2006.01)
*E05F 15/619* (2015.01)
*F16G 13/20* (2006.01)

(52) U.S. Cl.
CPC ........ *F16H 19/0636* (2013.01); *E05F 15/619* (2015.01); *E05Y 2201/656* (2013.01);
(Continued)

(58) Field of Classification Search
CPC .... F16H 19/0636; F16G 13/20; E05F 15/619; E05Y 2201/656; E05Y 2201/724
See application file for complete search history.

(56) References Cited

U.S. PATENT DOCUMENTS

| 2,048,131 | A | * | 7/1936 | Madsen | .................. | E05F 11/06 |
| | | | | | | 49/325 |
| 3,911,802 | A | * | 10/1975 | Morden | ................. | B60J 7/0573 |
| | | | | | | 296/223 |

(Continued)

FOREIGN PATENT DOCUMENTS

| CH | 669590 A5 | 3/1989 |
| DE | 717768 | 11/1941 |

(Continued)

OTHER PUBLICATIONS

International Search Report issued by the European Patent Office in International Application PCT/EP2019/054427 dated May 29, 2019.

(Continued)

*Primary Examiner* — David M Fenstermacher
(74) *Attorney, Agent, or Firm* — Henry M. Feiereisen LLC (57) ABSTRACT

An actuator includes first and second structural units arranged independently of one another. An engagement means is arranged in the first structural unit. A drive motor is in driving relationship to the engagement means and arranged in the first structural unit. An anti-backbend chain is in engagement with the engagement means, and a chain depot is arranged in the second structural unit.

23 Claims, 6 Drawing Sheets

(52) U.S. Cl.
CPC ... *E05Y 2201/724* (2013.01); *E05Y 2900/148* (2013.01); *F16G 13/20* (2013.01)

(56) References Cited

U.S. PATENT DOCUMENTS

| | | | | |
|---|---|---|---|---|
| 5,203,746 | A * | 4/1993 | Lehnert | E04H 12/185 |
| | | | | 474/209 |
| 5,277,097 | A * | 1/1994 | Pehker | F41A 9/43 |
| | | | | 89/47 |
| 6,419,603 | B1 * | 7/2002 | Grasl | B66F 3/06 |
| | | | | 474/251 |
| 2007/0169414 | A1 | 7/2007 | Soerensen | |
| 2011/0126650 | A1 * | 6/2011 | Sorensen | F16H 19/0636 |
| | | | | 29/401.1 |
| 2013/0205926 | A1 * | 8/2013 | Huang | F16G 13/20 |
| | | | | 74/30 |
| 2014/0000393 | A1 * | 1/2014 | Rojo | F16H 19/0636 |
| | | | | 74/89.21 |
| 2014/0109701 | A1 * | 4/2014 | Ishikawa | F16H 19/0636 |
| | | | | 74/30 |
| 2016/0348769 | A1 * | 12/2016 | Siegal | F16G 13/20 |
| 2017/0137053 | A1 * | 5/2017 | Fei | B62D 3/126 |
| 2018/0207812 | A1 * | 7/2018 | Yoon | B25J 9/0027 |
| 2019/0093734 | A1 * | 3/2019 | Yoon | F16H 19/0663 |
| 2021/0207692 | A1 * | 7/2021 | Tchatchoua | E05F 15/619 |
| 2021/0364068 | A1 * | 11/2021 | Wolf | F16H 19/0636 |

FOREIGN PATENT DOCUMENTS

| | | |
|---|---|---|
| DE | 2717288 A1 | 11/1978 |
| DE | 202 21 581 | 7/2006 |
| DE | 202014001171 | 6/2014 |
| DE | 102016000566 | 7/2017 |
| DE | 102016000568 A1 | 7/2017 |
| DE | 102916000568 | 7/2017 |
| NL | 1033845 | 11/2008 |
| WO | WO 2004/076792 | 9/2004 |

OTHER PUBLICATIONS

German Search Report DE 10 2018 104 768.1 dated Nov. 29, 2018.
Translation of German Search Report DE 10 2018 104 768.1 dated Nov. 29, 2018.

* cited by examiner

ACTUATOR COMPRISING ANTI-BACKBEND CHAIN

CROSS-REFERENCES TO RELATED APPLICATIONS

This application is the U.S. National Stage of International Application No. PCT/EP2019/054427, filed Feb. 22, 2019, which designated the United States and has been published as International Publication No. WO 2019/166340 A1 and which claims the priority of German Patent Application, Serial No. 10 2018 104 768.1, filed Mar. 2, 2018, pursuant to 35 U.S.C. 119(a)-(d).

BACKGROUND OF THE INVENTION

The Invention relates to an actuator comprising an anti-backbend chain, a drive motor, an engagement means which can be driven by the drive motor, the anti-backbend chain being in engagement with the drive means, and a chain depot.

DE 20221581 U1 discloses an actuator which moves an anti-backbend chain by means of a spindle driven by a motor. The actuator is used to open and close a window sash, for example. The electric motor is provided with a transmission and drives the spindle substantially as an extension of the motor. The chain is also accommodated mainly as an extension of the electric motor along the spindle with which the chain is in engagement. The stroke movement of this actuator takes place substantially perpendicularly to the spindle axis. For this purpose, the anti-backbend chain is deflected in front of the electric motor and guided to the outside, where it is then connected to the element to be operated, e.g. a window sash. This leads to a very slim design of the actuator, although this takes up a considerable length.

A hand-operated version of an actuator comprising an anti-backbend chain is known from DE714768. Here, too, the chain is deflected such that the chain is unfavorably accommodated.

DE 10 2016 000 568 A1 discloses an actuator comprising an anti-backbend chain having a worm that can be driven by the drive motor, the anti-backbend chain of which actuator is guided along the drive motor at least in part. The chain depot is located laterally along the drive motor, in which depot the end of the chain remote from operation is guided back and forth.

The document DE 10 2016 000 566 A1 describes an actuator comprising an anti-backbend chain having a hollow worm which is driven by a drive motor and which is in engagement with the anti-backbend chain. The chain depot is located behind the drive motor.

In the known actuators comprising an anti-backbend chain, the accommodation of the chain leads to a space-consuming construction and, depending on the direction of shear force, to not entirely insignificant wear.

It is therefore the object of the present invention to provide an actuator of the type mentioned at the outset which offers expanded possibilities for accommodating chains and has little wear.

SUMMARY OF THE INVENTION

The object is achieved by the method according to the invention as set forth hereinafter.

The actuator according to the invention comprises a drive motor, an engagement means which can be driven by the drive motor, and a chain depot. The engagement means is in engagement with an anti-backbend chain and transmits the power of the drive motor. According to the invention, the actuator is designed such that the actuator comprises a first and a second structural unit. The drive motor and the engagement means are arranged in the first structural unit, and the chain depot is arranged in the second structural unit. The first structural unit can be arranged independently of the arrangement of the second structural unit. Because of this separate design, it is possible in particular to make the installation space of the actuator small. In addition, it is possible to adapt to the spatial conditions in which the actuator is to be used. The dimensions of the actuator can be long and narrow, for example, or short and wide. The flexibility of the design of the actuator allows possibilities for accommodating the actuator which are not possible or are only possible to a limited extent with the solutions known from the prior art.

Further advantageous developments of the invention are set out in the dependent claims.

In a further embodiment of the invention, the chain depot comprises a second housing in which the anti-backbend chain can be stowed. The second housing protects the region of the chain remote from operation from contamination and at the same time forms a privacy screen.

In a further embodiment of the invention, the second housing has an opening through which the anti-backbend chain can be inserted. The opening also serves as a guide for the chain, as the end of the anti-backbend chain remote from operation is positioned in the chain depot at maximum extended stroke of the actuator. It is not necessary to guide the anti-backbend chain into the chain depot.

In a further embodiment of the invention, the second housing has a multi-part design. This has the advantage that, in the event of service or repair, the chain is also easily accessible in the chain depot, since only part of the second housing has to be removed or opened.

In a further embodiment of the invention, a guide element is arranged in the chain depot. In a further aspect of the invention, the guide element is suitable for deflecting the anti-backbend chain in the unloaded portion of the anti-backbend chain. It is thus possible to guide the two chain portions at an angle to one another by means of the guide element. Due to the different design options for the guide element, it is possible to flexibly adapt to the spatial conditions in which the actuator is used.

In a further embodiment of the invention, the anti-backbend chain in the chain depot can be deflected and stored in two chain portions running parallel to one another. Deflecting the anti-backbend chain into two parallel chain portions is particularly space-saving.

In a further embodiment of the invention, a chain portion of the anti-backbend chain can be accommodated in the chain depot, the length of which portion corresponds to at least 0.5 times, preferably 0.7 times and particularly preferably 0.8 times, the maximum stroke length of the actuator. To reduce the length of the actuator, the largest possible region of the length of the anti-backbend chain can be accommodated in the chain depot. The total length of the actuator in the retracted state of the anti-backbend chain is considerably reduced at maximum retracted stroke of the actuator.

In a further embodiment of the invention, the end of the anti-backbend chain remote from operation is fastened in the region of the chain depot. In a further embodiment of the invention, the end of the anti-backbend chain remote from operation is positioned in the chain depot at maximum extended stroke of the actuator. Due to the positioning of the end of the anti-backbend chain remote from operation in the chain depot, it is not necessary to guide the anti-backbend chain into the chain depot while the stroke length is being reduced. The unloaded region of the anti-backbend chain moves into the chain depot due to its inherent rigidity.

In a further embodiment of the invention, the first structural unit has a first housing, the second structural unit being arranged outside the first housing of the first structural unit. This has the advantage that the first structural unit can be positioned independently of the second structural unit.

In a further development according to the invention, the first housing encloses the drive motor and the engagement means. This has the advantage that the first structural unit with the sensitive electronic components is protected from contamination.

In a particularly advantageous embodiment of the invention, the first structural unit can be arranged separately from the second structural unit. The first and second structural units can be attached at an angle with respect to one another, for example. The flexibility of the design of the actuator allows possibilities for accommodating the actuator which are not possible or are only possible to a limited extent with the solutions known from the prior art.

In a further aspect of the invention, the first and second structural units each have at least one fastening element. The first and second structural units are fastened to a connecting element, for example a base plate, by fastening elements. Due to this construction of the actuator, the actuator can be installed as an independent unit for many applications and can be exchanged quickly and inexpensively if necessary.

In a further particularly advantageous embodiment of the invention, the second structural unit can be positioned and/or fastened independently of the first structural unit. The second structural unit can be attached at any angle with respect to the first structural unit, and the actuator can thus be flexible.

In a further advantageous embodiment of the invention, the second structural unit can be positioned and/or fastened at a distance from the first structural unit. The second structural unit can be attached at a distance from the first structural unit. Only the length of the anti-backbend chain has to be adjusted depending on the distance between the two structural units.

In a further advantageous embodiment of the invention, the anti-backbend chain has a longitudinal chain axis. The first structural unit can be positioned and/or fastened in relation to the second structural unit such that the longitudinal chain axis of a chain portion of the anti-backbend chain has, in the region of engagement of the engagement means in the anti-backbend chain, a different position and/or orientation than the longitudinal chain axis of a chain portion of the anti-backbend chain in the region of the chain depot. The anti-backbend chain is therefore curved in the region between the first and second structural units. This advantageous design reduces the overall length and increases the flexibility of the shape of the actuator.

In a further embodiment of the invention, the actuator has a connecting element which can be arranged between the first and second structural units. In a further embodiment of the invention, the connecting element can be connected to the first and second structural units. The connecting element thus connects the first and second structural units. This has the advantage that the two structural units can already be positioned in relation to one another during pre-assembly using the connecting element in a manner that is advantageous for use. Assembly then takes place in the pre-assembled state of the first and second structural units together with the connecting element. The connecting element can also optionally have fastening means that can be used for assembly.

In a further aspect of the invention, the connecting element is designed as a guide element and is suitable for guiding the anti-backbend chain between the first and second structural units.

In a further embodiment of the invention, the connecting element is designed as a guide element and is suitable for deflecting the anti-backbend chain between the first and second structural units. This is particularly necessary when the anti-backbend chain is to be guided in a curved manner in the region between the first and second structural units. The curvature of the anti-backbend chain reduces the overall length of the actuator.

In a further embodiment of the invention, the connecting element is designed as a rail. By suitable choice of the material of the guide element, the friction between the anti-backbend chain and the guide element can be reduced. The guide element can also be designed to be exchangeable.

In a further embodiment of the invention, the connecting element is designed as a tube. A tubular connecting element prevents contamination of the anti-backbend chain in the region between the first and second structural units.

In a further embodiment of the invention, the connecting element is flexibly bendable and consists of a polymer, for example. As a result of this design, the second structural unit can be positioned flexibly in a large angular range in relation to the first structural unit.

BRIEF DESCRIPTION OF THE DRAWING

Embodiments of the device according to the invention are shown in the drawings in a schematically simplified manner and are explained in more detail in the following description.

In the drawings.

DETAILED DESCRIPTION OF PREFERRED EMBODIMENTS

Figure 1:
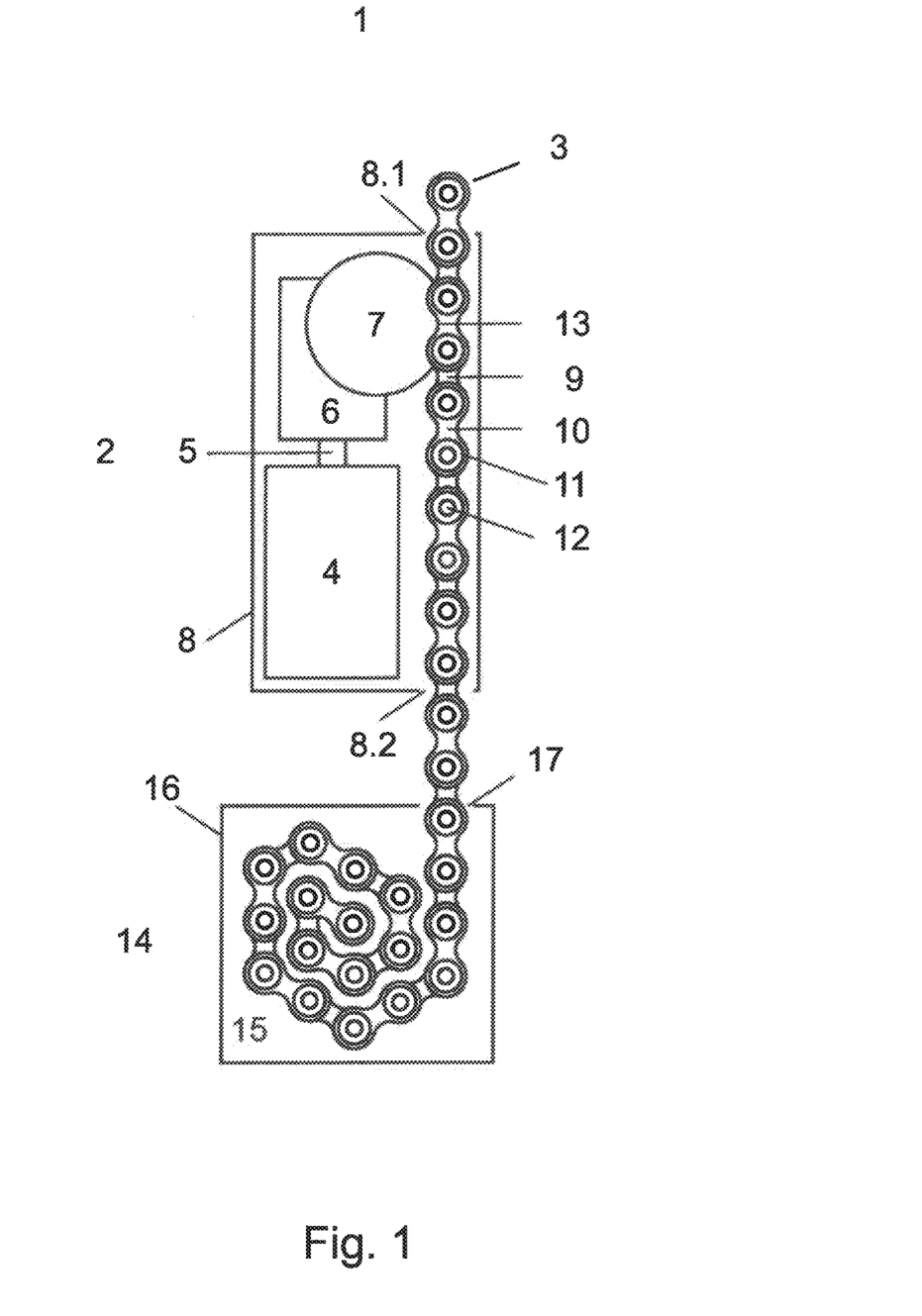
FIG. 1 shows an embodiment of an actuator according to the invention.

An embodiment of the actuator 1 according to the invention is shown in FIG. 1. The actuator 1 comprises two structural units. The first structural unit 2 has a drive motor 4 and an engagement means 7. To increase the torque and reduce the speed of the drive motor 4, a transmission 6 is installed in the first structural unit 2, which transmission is connected to the drive motor 4 by a drive shaft 5. The first structural unit 2 is accommodated in a housing 8 for protection. The engagement means 7 engages in the engagement region 13 in an anti-backbend chain 3, which is designed here as an outer link chain. The anti-backbend chain 3 has inner chain links 9 connected via outer chain links 10. Chain pins 12 connect an outer chain link 10 to an inner chain link 9. Stiffening tabs 11 restrict bending of the anti-backbend chain 3 only in one direction. In order to pass the anti-backbend chain 3 through the first structural unit 2, the first housing 8 has openings 8.1, 8.2 on opposite sides. The second structural unit 14 has the chain depot 15. The second structural unit 14 is advantageously also accommodated in a second housing 16. An opening 17 is arranged in the second housing 16 for passing the anti-backbend chain 3 through. The two housings 8, 16 are arranged separately from one another and do not enclose one another. The first structural unit 2 is not connected to the second structural unit 14, so that the two structural units can be positioned independently of one another.

In this embodiment, the anti-backbend chain 3 is positioned helically with its maximum length in the unloaded region of the anti-backbend chain 3 in the chain depot 15 at minimum stroke of the actuator 1. Because the anti-backbend chain 3 can only be bent in one direction, when the stroke is reduced by the first structural unit 2, i.e. when the length of the unloaded region of the anti-backbend chain 3 is increased, the anti-backbend chain 3 is necessarily guided into the chain depot 15 in a worm shape and accommodated. The chain depot 15 is dimensioned such that a chain length can be accommodated in the chain depot 15, which length particularly preferably corresponds to 0.8 times the maximum stroke length of the actuator 1. The total length of the actuator 1 in the retracted state of the anti-backbend chain 3 is considerably reduced at maximum retracted stroke of the actuator 1. In particular, the first structural unit 2 can be positioned separately and at a distance from the second structural unit 14. Only the length of the anti-backbend chain 3 has to be adjusted depending on the distance between the two structural units.

Figure 2:
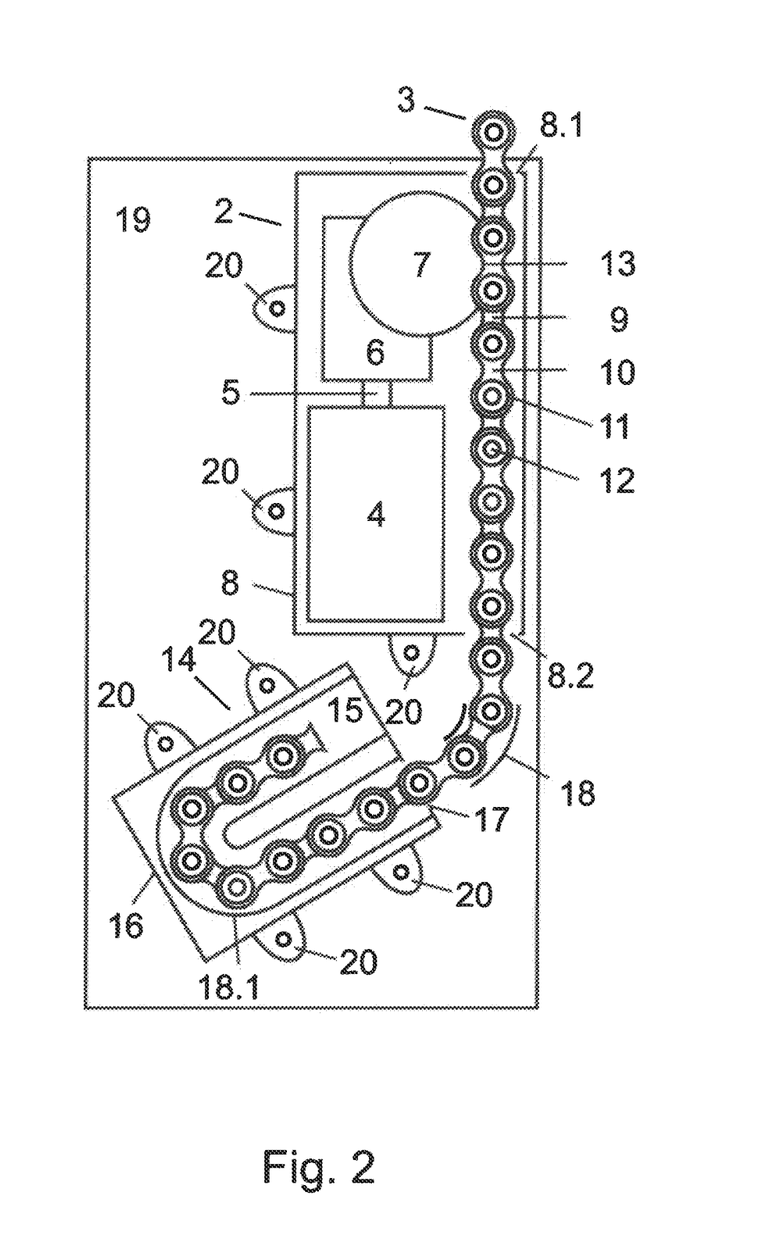
FIG. 2 shows an embodiment of an actuator according to the invention having a connecting element and modular structure.

FIG. 2 shows an embodiment of the actuator 1 according to the invention in which the first structural unit 2 and second structural unit 14 are designed as modules. The first structural unit 2 has a drive motor 4 and an engagement means 7. To increase the torque and reduce the speed of the drive motor 4, a transmission 6 is installed in the first structural unit 2, which transmission is connected to the drive motor 4 by a drive shaft 5. The first structural unit 2 is accommodated in a first housing 8 for protection. The engagement means 7 engages in the engagement region 13 in an anti-backbend chain 3, which is designed here as an outer link chain. The anti-backbend chain 3 has inner chain links 9 connected via outer chain links 10. Chain pins 12 connect an outer chain link 10 to an inner chain link 9. Stiffening tabs 11 restrict bending of the anti-backbend chain 3 only in one direction. In order to pass the anti-backbend chain 3 through the first structural unit 2, the first housing 8 has openings 8.1, 8.2 on opposite sides.

The second structural unit 14 has the chain depot 15. The second structural unit 14 is also accommodated in a second housing 16. An opening 17 is arranged in the second housing 16 for passing the anti-backbend chain 3 through. The first structural unit 2 and second structural unit 14 are, in their respective housings 8, 16, fastened to a connecting element 19 by fastening elements 20. The distance and orientation of the two structural units 2, 14 each arranged in separate housings 8, 16 can be freely selected. Due to this construction of the actuator 1, the actuator 1 can be installed as an independent unit for many applications and can be exchanged quickly and inexpensively if necessary.

In order to keep the overall length of the actuator 1 as small as possible, it is advantageous to guide the anti-backbend chain 3 between the first structural unit 2 and second structural unit 14 in a curved manner, i.e. to position the second structural unit 14 such that the longitudinal chain axis of a chain portion of the anti-backbend chain has 3, in the region of engagement of the engagement means 7 in the anti-backbend chain 3, a different position and/or orientation than the longitudinal chain axis of a chain portion of the anti-backbend chain 3 in the region of the chain depot 15. In this embodiment, a guide element 18 is therefore arranged between the first structural unit 2 and second structural unit 14. The guide element 18 is designed as a rail. By suitable choice of the material of the guide element 18, the friction between the anti-backbend chain 3 and the guide element 18 can be reduced. The guide element 18 can also be designed to be exchangeable.

In this embodiment, the second housing 16 of the chain depot 15 has a multi-part design. The second housing 16 has a further guide element 18.1. This guide element 18.1 deflects the portion of the anti-backbend chain 3 in the chain depot 15 such that the anti-backbend chain 3 is stored in two chain portions running substantially parallel to one another. This achieves a short overall length of the actuator 1.

Figure 3:
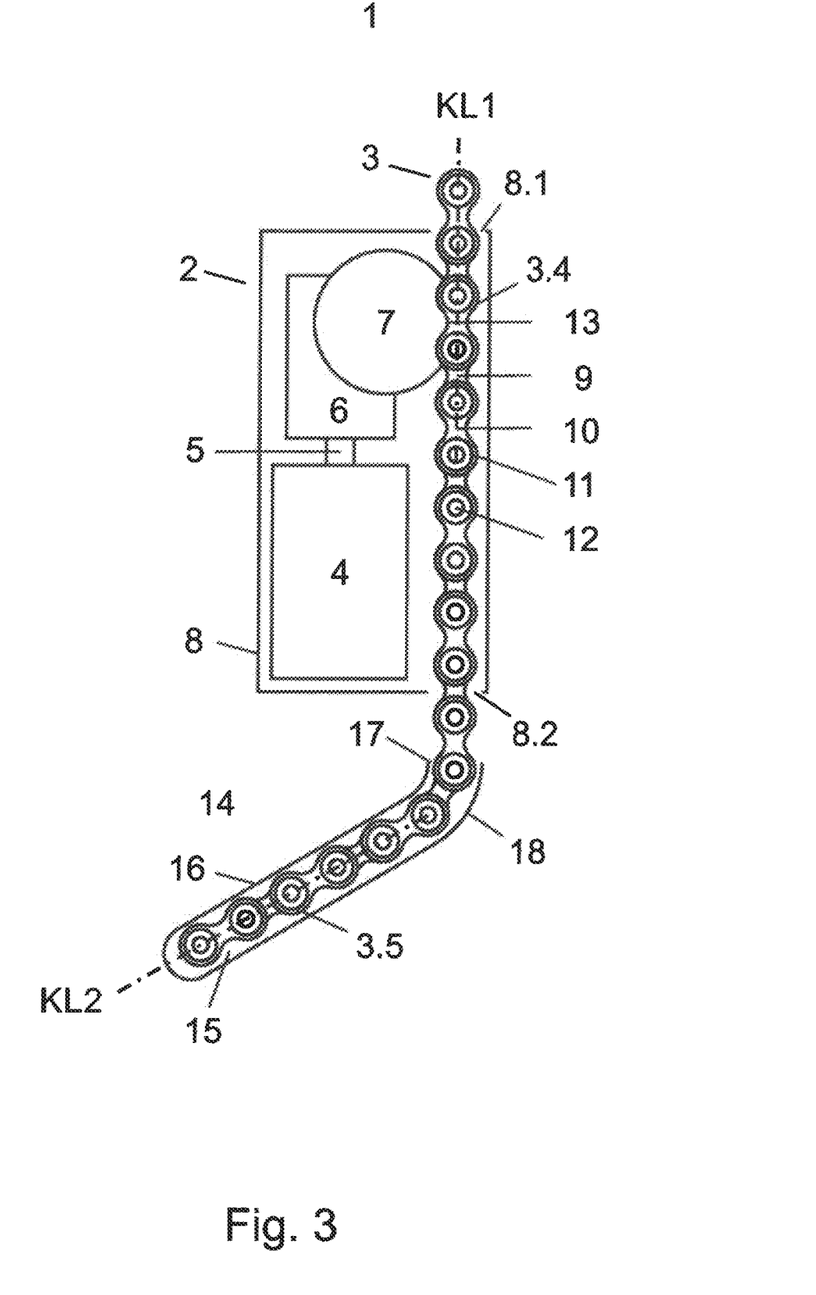
FIG. 3 shows an embodiment of an actuator according to the invention having a guide element that is positioned in the chain depot.

FIG. 3 shows a further embodiment of the actuator 1 according to the invention having a guide element 18 which is positioned in the chain depot 15. The first structural unit 2 has a drive motor 4 and an engagement means 7. To increase the torque and reduce the speed of the drive motor 4, a transmission 6 is installed in the first structural unit 2, which transmission is connected to the drive motor 4 by a drive shaft 5. The first structural unit 2 is accommodated in a first housing 8 for protection. The engagement means 7 engages in the engagement region 13 in an anti-backbend chain 3, which is designed here as an outer link chain. The anti-backbend chain 3 has inner chain links 9 connected via outer chain links 10. Chain pins 12 connect an outer chain link 10 to an inner chain link 9. Stiffening tabs 11 restrict bending of the anti-backbend chain 3 only in one direction. In order to pass the anti-backbend chain 3 through the first structural unit 2, the first housing 8 has openings 8.1, 8.2 on opposite sides.

The second structural unit 14 has the chain depot 15. The second structural unit 14 is also accommodated in a second housing 16. An opening 17 is arranged in the second housing 16 for passing the anti-backbend chain 3 through. The anti-backbend chain 3 is guided into the chain depot 15 in a curved manner. The guide element 18 is flexible and positioned in the chain depot 15. This guiding causes a different alignment of the longitudinal chain axis KL1 of the chain portion of the anti-backbend chain 3 in the region of engagement of the engagement means 7 with respect to the longitudinal chain axis KL2 of a chain portion of the anti-backbend chain 3 in the region of the chain depot 15. This manner of guiding of the anti-backbend chain 3 allows a short overall length of the actuator 1.

Figure 4:
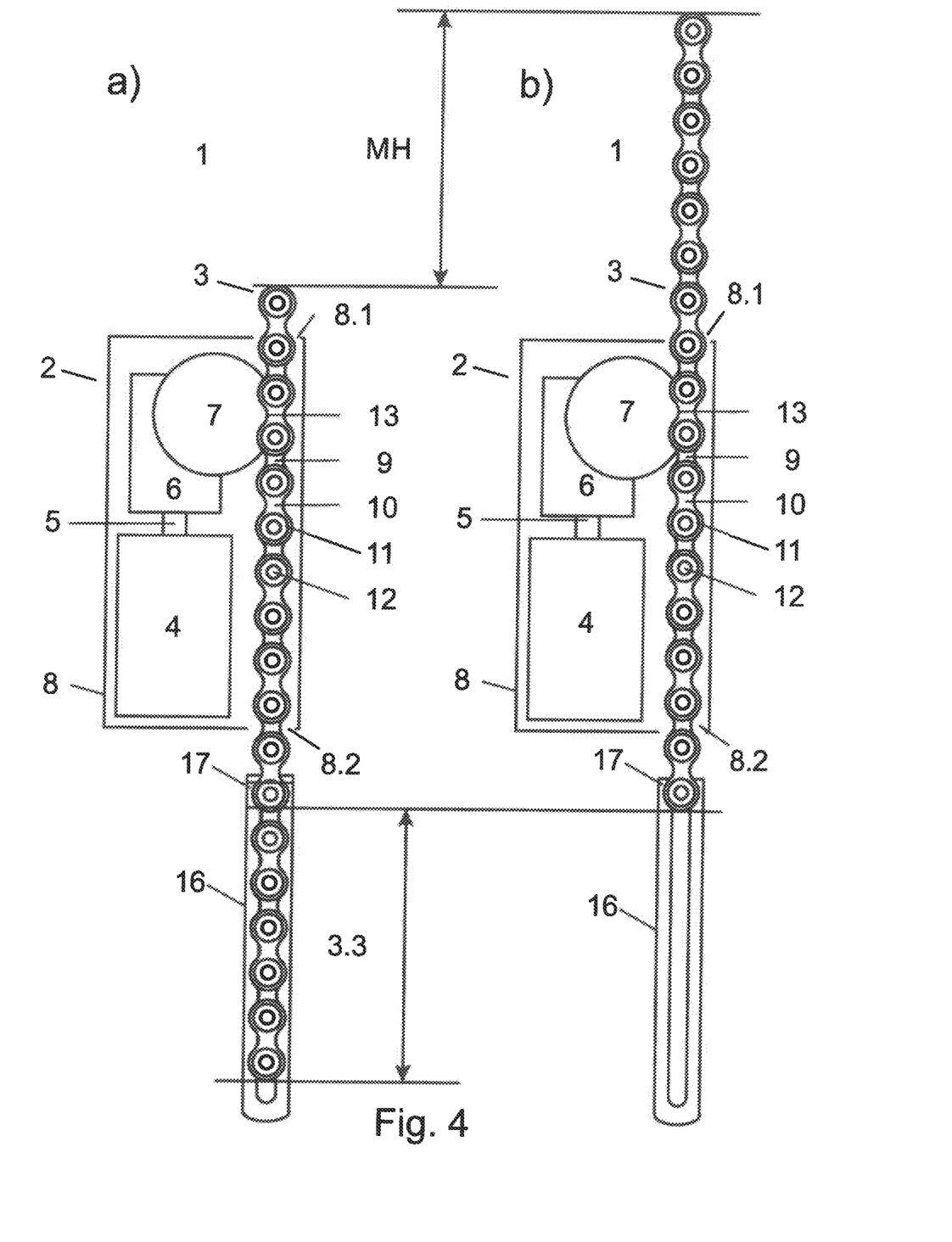
FIG. 4 shows the position of the anti-backbend chain at minimum stroke (FIG. 4a) and maximum stroke (FIG. 4b) of the actuator.

FIG. 4 shows the position of the anti-backbend chain 3 at minimum stroke (FIG. 4a) and maximum stroke MH (FIG. 4b) of the actuator 1. The first structural unit 2 has a drive motor 4 and an engagement means 7. To increase the torque and reduce the speed of the drive motor 4, a transmission 6 is installed in the first structural unit 2, which transmission is connected to the drive motor 4 by a drive shaft 5. The first structural unit 2 is accommodated in a first housing 8 for protection. The engagement means 7 engages in the engagement region 13 in an anti-backbend chain 3, which is designed here as an outer link chain. The anti-backbend chain 3 has inner chain links 9 connected via outer chain links 10. Chain pins 12 connect an outer chain link 10 to an inner chain link 9. Stiffening tabs 11 restrict bending of the anti-backbend chain 3 only in one direction. In order to pass the anti-backbend chain 3 through the first structural unit 2, the first housing 8 has openings 8.1, 8.2 on opposite sides.

The second structural unit 14 has the chain depot 15. The second structural unit 14 is also accommodated in a second housing 16. An opening 17 is arranged in the second housing 16 for passing the anti-backbend chain 3 through. The two structural units 2, 14 with their respective housings 8, 16 can be positioned independently of one another. At minimum stroke of the actuator 1 (FIG. 4a), a maximum portion of the unloaded region of the anti-backbend chain 3 is located in the chain depot 15. If the stroke movement of the actuator 1 is at a maximum (FIG. 4b), the end of the anti-backbend chain 3 remote from operation is positioned in the chain depot 15.

The chain depot can also have a sensor, for example via position elements attached to the anti-backbend chain 3, which monitors the position of the anti-backbend chain 3. The sensor then ensures a corresponding control of the drive motor 4, which switches oft the drive motor 4 when the maximum stroke length MH of the actuator 1 is reached. Due to the positioning of the end of the anti-backbend chain 3 remote from operation in the chain depot 15, it is not necessary to guide the anti-backbend chain 3 into the chain depot 15 while the stroke length is being reduced. The unloaded region of the anti-backbend chain 3 moves into the chain depot 15 due to its inherent rigidity.

Figure 5:
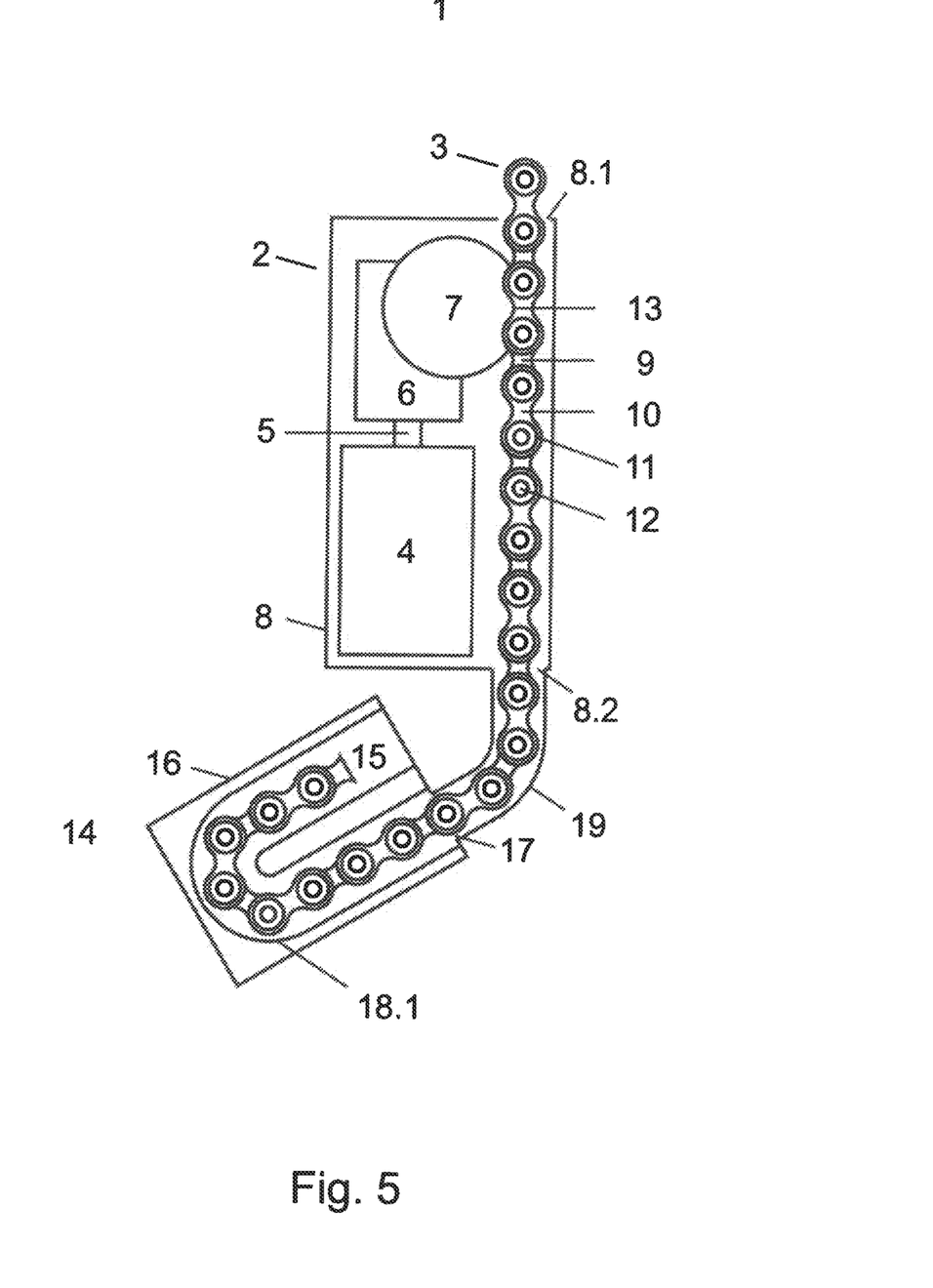
FIG. 5 shows an embodiment of an actuator according to the invention having a tubular connecting element.

An embodiment of the actuator 1 according to the invention having a tubular connecting element 19 is shown in FIG. 5. The first structural unit 2 has a drive motor 4 and an engagement means 7. To increase the torque and reduce the speed of the drive motor 4, a transmission 6 is installed in the first structural unit 2, which transmission is connected to the drive motor 4 by a drive shaft 5. The first structural unit 2 is accommodated in a first housing 8 for protection. The engagement means 7 engages in the engagement region 13 in an anti-backbend chain 3, which is designed here as an outer link chain. The anti-backbend chain 3 has inner chain links 9 connected via outer chain links 10. Chain pins 12 connect an outer chain link 10 to an inner chain link 9. Stiffening tabs 11 restrict bending of the anti-backbend chain 3 only in one direction. In order to pass the anti-backbend chain 3 through the first structural unit 2, the first housing 8 has openings 8.1, 8.2 on opposite sides.

The second structural unit 14 has the chain depot 15. The second structural unit 14 is also accommodated in a second housing 16. An opening 17 is arranged in the second housing 16 for passing the anti-backbend chain 3 through. A tubular connecting element 19 is attached between the opening of the second housing 16 of the second structural unit 14 and the opening 8.2 of the first housing 8 of the first structural unit 8 nearest thereto, which connecting element connects the first structural unit 2 and second structural unit 14 to one another. This connecting element 19 can also be flexible and bendable, for example made of a polymer. As a result of this design, the second structural unit 14 can be positioned in a large angular range in relation to the first structural unit 2.

Figure 6:
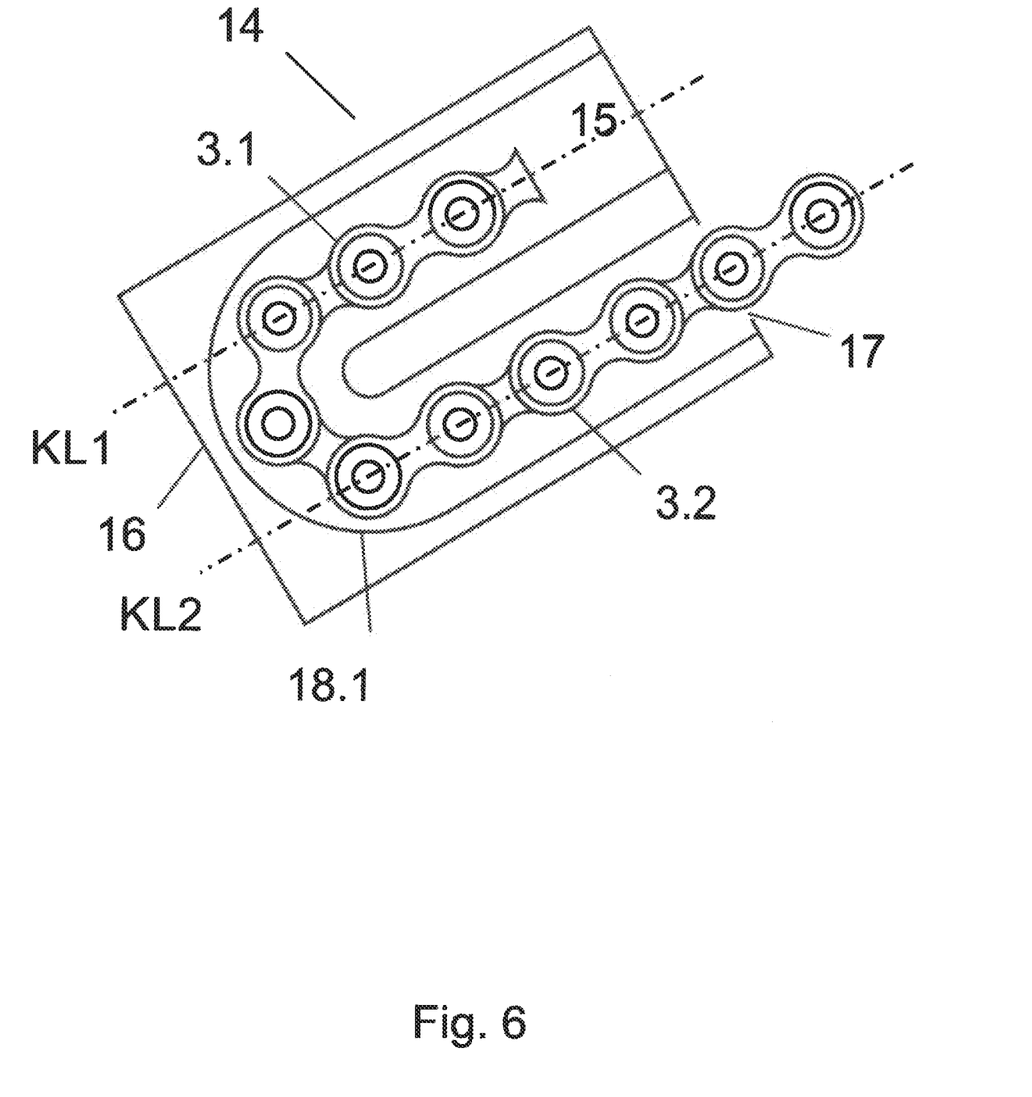
FIG. 6 is a detailed view of the second structural unit.

A detailed view of the second structural unit 14 is shown in FIG. 6. The second structural unit 14 has the chain depot 15 and is accommodated in a second housing 16. An opening 17 is arranged in the second housing 16 for passing the anti-backbend chain 3 through. The second housing 16 of the chain depot 16 has a multi-part design. The second housing 16 has a guide element 18.1 which deflects the portion of the anti-backbend chain 3 in the chain depot 15 such that the anti-backbend chain 3 is stored in two chain portions. In this embodiment, the longitudinal chain axes KL1, KL2 of the two portions 3.1, 3.2 run substantially parallel to one another. However, if the guide element 18.1 is designed accordingly, it is also possible to guide the two chain portions 3.1, 3.2 at an angle to one another. Due to the different design options for the guide element 18.1, it is possible to flexibly adapt to the spatial conditions in which the actuator 1 is to be used. The flexibility of the design of the actuator 1 allows possibilities for accommodating the actuator 1 which are not possible or are only possible to a limited extent with the solutions known from the prior art.

The invention claimed is:

1. An actuator, comprising:
   first and second structural units arranged independently of one another;
   an engagement means arranged in the first structural unit;
   a drive motor in driving relationship to the engagement means, said the drive motor being arranged in the first structural unit;
   an anti-backbend chain in engagement with the engagement means; and
   a chain depot arranged in the second structural unit,
   wherein the anti-backbend chain is configured for deflection in the chain depot in two chain portions which run parallel to one another.

2. The actuator of claim 1, wherein the chain depot comprises a housing, said anti-backbend chain being configured for being stowed in the housing.

3. The actuator of claim 2, wherein the housing an opening for passage of the anti-backbend chain into the housing.

4. The actuator of claim 2, wherein the housing is made of multiple parts.

5. The actuator of claim 1, further comprising a guide element arranged in the chain depot.

6. The actuator of claim 5, wherein the guide element is configured to deflect the anti-backbend chain in an unloaded portion of the anti-backbend chain.

7. The actuator of claim 1, wherein the anti-backbend chain includes a chain portion configured for accommodation in the chain depot and having a length which corresponds to at least 0.5 times, preferably 0.7 times and particularly preferably 0.8 times, a maximum stroke length of the actuator.

8. The actuator of claim 1, wherein the anti-backbend chain has an end which is remote from operation and fastened in a region of the chain depot.

9. The actuator of claim 8, wherein the operation-remote end of the anti-backbend chain is positioned in the chain depot when the actuator assumes a maximum extended stroke.

10. The actuator of claim 1, wherein the first structural unit has a housing, said second structural unit being arranged outside the housing of the first structural unit.

11. The actuator of claim 1, wherein the first structural unit is arranged separately from the second structural unit.

12. The actuator of claim 1, wherein the first structural unit and the second structural unit each have a fastening element.

13. The actuator of claim 1, wherein the second structural unit is positioned and/or fastened independently of the first structural unit.

14. The actuator of claim 1, wherein the second structural unit is positioned and/or fastened at a distance from the first structural unit.

15. The actuator of claim 1, further comprising a connecting element configured for arrangement between the first structural unit and the second structural unit.

16. The actuator of claim 15, wherein the connecting element is connectable to the first structural unit and/or the second structural unit.

17. The actuator of claim 15, wherein the connecting element is designed as a guide element configured to guide the anti-backbend chain between the first structural unit and the second structural unit.

18. The actuator of claim 15, wherein the connecting element is designed as a guide element configured to deflect the anti-backbend chain between the first structural unit and the second structural unit.

19. The actuator of claim 15, wherein the connecting element is designed as a rail.

20. The actuator of claim 15, wherein the connecting element is designed as a tube.

21. The actuator of claim 15, wherein the connecting element is designed to be bendable.

22. An actuator, comprising: first and second structural units arranged independently of one another, with the first structural unit having a housing and with the second structural unit being arranged outside the housing of the first structural unit; an engagement means arranged in the first structural unit; a drive motor in driving relationship to the engagement means, said the drive motor being arranged in the first structural unit; an anti-backbend chain in engagement with the engagement means; and a chain depot arranged in the second structural unit, wherein the housing is configured to enclose the drive motor and the engagement means.

23. An actuator, comprising:

first and second structural units arranged independently of one another; an engagement means arranged in the first structural unit; a drive motor in driving relationship to the engagement means, said the drive motor being arranged in the first structural unit; an anti-backbend chain in engagement with the engagement means; and a chain depot arranged in the second structural unit, wherein the anti-backbend chain has a longitudinal chain axis, said first structural unit being configured for positioning and/or fastening in relation to the second structural unit such that the longitudinal chain axis of a chain portion of the anti-backbend chain has, in a region of engagement of the engagement means in the anti-backbend chain, a different position and/or orientation than the longitudinal chain axis of a chain portion of the anti-backbend chain in a region of the chain depot.

* * * * *